(12) United States Patent
Onfray et al.

(10) Patent No.: US 10,584,720 B2
(45) Date of Patent: Mar. 10, 2020

(54) VANE COMPRISING AN ASSEMBLED PLATFORM AND BLADE

(71) Applicant: SAFRAN AIRCRAFT ENGINES, Paris (FR)

(72) Inventors: Remi Philippe Guy Onfray, Bretigny sur Orge (FR); Baptiste Rene Roger Batonnet, Sezanne (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 129 days.

(21) Appl. No.: 15/728,660

(22) Filed: Oct. 10, 2017

(65) Prior Publication Data

US 2018/0100516 A1 Apr. 12, 2018

(30) Foreign Application Priority Data

Oct. 12, 2016 (FR) ...................................... 16 59866

(51) Int. Cl.
*F04D 29/44* (2006.01)
*F04D 29/54* (2006.01)
(Continued)

(52) U.S. Cl.
CPC ............ *F04D 29/544* (2013.01); *B23P 15/04* (2013.01); *F01D 5/282* (2013.01); *F01D 9/042* (2013.01);
(Continued)

(58) Field of Classification Search
CPC .... F04D 29/544; F04D 29/023; F04D 29/542; B23P 15/04; F01D 5/282; F01D 9/042;
(Continued)

(56) References Cited

U.S. PATENT DOCUMENTS 3,442,442 A * 5/1969 Seiwert ................... F01D 5/282
  415/190
3,801,222 A * 4/1974 Violette ................ F01D 5/3007
  416/220 R (Continued)

FOREIGN PATENT DOCUMENTS

| EP | 1 419 849 A1 | 5/2004 |
| EP | 1 944 465 A2 | 7/2008 |
| FR | 2 559 423 A1 | 8/1985 |

OTHER PUBLICATIONS

French Preliminary Search Report dated May 30, 2017 in French Application 16 59866 filed on Oct. 12, 2016 (with English Translation of Categories of Cited Documents).

*Primary Examiner* — Hung Q Nguyen
*Assistant Examiner* — Anthony Donald Taylor, Jr.
(74) *Attorney, Agent, or Firm* — Oblon, McClelland, Maier & Neustadt, L.L.P.

(57) ABSTRACT

A blade portion of a vane is assembled to a platform portion by insertion into a cavity in the latter, in a lateral direction from an opening in the cavity, where the cavity possesses a back wall over at least a portion of its surface area. The bonding surface area between the portions of the vane is increased. The back wall of the cavity includes an inclined portion against which the portion of the blade makes contact at the end of its insertion movement, ensuring surface contact which is favorable to achieving an increased bonding area.

11 Claims, 4 Drawing Sheets

(51) Int. Cl.
  *B23P 15/04* (2006.01)
  *F01D 5/28* (2006.01)
  *F01D 9/04* (2006.01)
  *F04D 29/02* (2006.01)
  *F01D 5/14* (2006.01)
  *F01D 9/02* (2006.01)

(52) U.S. Cl.
  CPC ......... *F04D 29/023* (2013.01); *F04D 29/542* (2013.01); *F01D 5/147* (2013.01); *F01D 9/02* (2013.01); *F05D 2220/36* (2013.01); *F05D 2230/23* (2013.01); *F05D 2240/80* (2013.01); *F05D 2260/36* (2013.01); *F05D 2300/603* (2013.01)

(58) Field of Classification Search
  CPC ........ F01D 5/147; F01D 9/02; F05D 2220/36; F05D 2230/23; F05D 2240/80; F05D 2260/36; F05D 2300/603
  USPC ......................................................... 415/191
  See application file for complete search history.

(56) References Cited

U.S. PATENT DOCUMENTS

| | | | | |
|---|---|---|---|---|
| 3,909,157 | A * | 9/1975 | Wachtell | B23P 6/005 29/889.1 |
| 5,797,725 | A * | 8/1998 | Rhodes | B23P 6/005 415/209.2 |
| 7,972,113 | B1 * | 7/2011 | Davies | F01D 5/025 416/214 A |
| 9,062,562 | B2 * | 6/2015 | Coupe | F01D 25/00 |
| 9,080,454 | B2 * | 7/2015 | Coupe | B29C 70/222 |
| 9,194,238 | B2 * | 11/2015 | Roberts, III | F01D 5/284 |
| 9,228,445 | B2 * | 1/2016 | Darkins, Jr. | F01D 5/147 |
| 9,593,586 | B2 * | 3/2017 | Clark | F01D 9/042 |
| 9,745,856 | B2 * | 8/2017 | Uskert | F01D 5/282 |
| 2006/0140768 | A1 * | 6/2006 | Tam | F01D 5/143 416/193 A |
| 2006/0233641 | A1 * | 10/2006 | Lee | F01D 5/143 415/208.1 |
| 2007/0148000 | A1 * | 6/2007 | Marusko | F01D 5/282 416/193 A |
| 2007/0154307 | A1 * | 7/2007 | Cairo | F01D 9/042 415/209.3 |
| 2007/0258818 | A1 * | 11/2007 | Allen-Bradley | F01D 5/145 416/193 A |
| 2010/0158696 | A1 * | 6/2010 | Pandey | F01D 5/143 416/243 |
| 2011/0142639 | A1 * | 6/2011 | Campbell | F01D 5/081 416/95 |
| 2011/0142684 | A1 * | 6/2011 | Campbell | B23P 15/04 416/248 |
| 2012/0051923 | A1 * | 3/2012 | McDonald | F01D 9/042 416/219 R |
| 2012/0076660 | A1 * | 3/2012 | Spangler | F01D 5/187 416/223 R |
| 2013/0011265 | A1 * | 1/2013 | Miller | F01D 11/008 416/191 |
| 2013/0189092 | A1 * | 7/2013 | Dube | F01D 5/16 415/200 |
| 2013/0205800 | A1 * | 8/2013 | Ivakitch | F01D 9/042 60/805 |
| 2013/0243604 | A1 * | 9/2013 | Roussille | B29C 70/24 416/241 A |
| 2014/0234088 | A1 * | 8/2014 | Brandl | F01D 5/081 415/177 |
| 2014/0255194 | A1 | 9/2014 | Jones | |
| 2015/0016972 | A1 * | 1/2015 | Freeman | F01D 5/189 415/175 |
| 2016/0230575 | A1 * | 8/2016 | Forcier | F01D 11/001 |
| 2017/0022821 | A1 * | 1/2017 | Ferber | F01D 5/025 |

\* cited by examiner

VANE COMPRISING AN ASSEMBLED PLATFORM AND BLADE

BACKGROUND OF THE INVENTION

Field of the Invention

The subject of the present invention is a vane comprising a platform and a blade which are assembled together.

Description of the Related Art

The vanes considered here comprise an aerodynamic portion, known as a blade, and a platform substantially perpendicular to the blade and which contributes to the connection with neighbouring structures. In certain known designs, in particular when the vane is constructed from light metal such as aluminum, the blade and the platform are made from a single piece. They may, however, be constructed separately and assembled together. This is generally even compulsory when the vane is constructed from composite material, which is now frequently the case. The blade is than constructed for the most part from polymer, due to its superior lightness and other portions of the vane, including the platform, may be made of fibre-reinforced polyurethane resin. Such a design is shown in FIG. 1. This exploded view shows the aforementioned platform 1 (which is an external platform) in relation to the shaft of the turbine engine when the part is assembled onto the rest of the engine, the blade 2, a metal reinforcement 4 of the leading edge of the blade 2 and an internal platform 5. When the vane is assembled, the blade 2 is connected to the platform 1, to the reinforcement 4 and to the internal platform 5. Assembly of the blade 2 to the platform 1 is usually achieved by bonding, although other methods are not excluded from the invention.

According to FIG. 2, in order to carry out this assembly, the blade 2 is introduced, by a first extremity 6 to which the internal platform 5 will then be assembled, into a cavity 7 cut out through the platform 1, and which has a cross section which is wider and longer than that of the blade 2. The movement is continued until a second extremity 8 of the blade 2 (which flares outwards towards the exterior) enters the cavity 7 and becomes immobilised there. Since the cavity 7 and the second extremity 8 have similar tapers, a close bond is achieved between the blade 2 and the platform 1, bonding which is made irreversible by the hardening of the adhesive applied thereto.

This manufacturing process has proven to be satisfactory in existing turbine engines. However, in order to save mass, improvements of the assembly process are sought for certain smaller blades, and with thinner platforms. Since the bonding surface area onto the edge of the second extremity is therefore reduced, this may lead to the vane having insufficient resistance to shear forces.

EP-1 944 465-A2 describes a vane made up of two portions assembled by a sliding movement of an interlocking connection in the lateral direction of the vane. FR-2 559 423-A describes a vane whose blade is embedded in a recess of a platform by movement in the longitudinal direction of the blade, until it rests against a back face of the recess; assembly using an elastomer is carried out. The assembly however appears to be less secure than that of the invention and the previously cited document does not involve the back face of a cavity in assembly of the two parts of the vane, only its lateral faces.

BRIEF SUMMARY OF THE INVENTION

A different method for assembly of the bladed vanes and platform, in particular made of composite material, is described here. Its aim is to increase the surface area for assembly, which is usually by bonding, between the blade and the platform, thus avoiding the aforementioned risk.

One general aspect of the invention is a vane comprising a platform and a blade assembled together, where one extremity of the blade enters a cavity in the platform and is fixed therein, where the platform comprises a first main face and a second main face, which are opposite each other in the direction of the thickness of the platform, where the extremity has sections which are tapered down towards the second main face in the direction of the thickness, where at least one part of the cavity is closed towards the first main face by a back wall of the platform and a terminal face of the extremity is fixed to the back wall.

The movement for introducing the blade through the cavity in the direction of the blade height is replaced by a lateral movement. The cavity comprises therefore a lateral opening to a peripheral face of the platform, through which the extremity may be introduced into the cavity in a longitudinal direction of the cavity perpendicular to the direction of the thickness. This is achieved by sliding the extremity of the blade into the cavity from the lateral opening and in the longitudinal direction of the cavity without the main portion of the blade passing through the cavity.

And the invention is characterised in that the back wall comprises a portion inclined in the direction of the thickness of the platform along a longitudinal direction of the cavity, said portion being an end-contact portion with a terminal face of the blade extremity which is assembled onto said portion.

The end-contact created at the location of the back wall portion, which is inclined relative to the blade insertion movement, ensures effective contact between the back wall and the blade at least at the location of this inclined portion (and even more so if the surface of the blade making contact is inclined at the same angle), and ensures a reliable bond with the strength to withstand the forces that the vane is subjected to in service. The assembly surface area between the platform and the blade is increased as a result of this contact with the back wall on which the extremity of the blade rests.

The back wall can if required extend over the entire cross-section of the cavity, but in general it is sufficient for it only to extend over a part of the latter, for example the part furthest from the lateral opening, with the remainder of the cavity then being hollowed out across the platform.

In various preferred embodiments of the invention which either allow easier manufacture of the blade and of the platform, or better assembly of these, one or other of the following arrangements, or several of them, may be adopted: the longitudinal direction of the cavity is substantially an arc of a circle; the width of the cavity (perpendicular to the direction of the thickness) tapers inwards from the lateral opening; the terminal face of the extremity of the platform comprises two portions, which may be flat, forming an external angle, one of which is adjacent to said contact face of the back wall; the terminal face of the extremity of the platform comprises an end-contact, corresponding to a sudden change of level, against an end-face of the back wall, where said end-face is directed towards the lateral opening of the cavity.

In one specific embodiment the terminal face of the extremity of the platform comprises a difference in level opposite an edge face of the back wall, where said edge face is directed towards the lateral opening of the cavity, and the terminal face possesses a portion which extends the back-face of the platform between the edge face and the lateral opening.

Specific mention must be made of the ability to add a stop pin to stop the extremity of the blade sliding into the cavity, where the pin extends through a drilling in the back wall and into a hole in the extremity of the blade. It is maintained in place by bonding or more generally fixed in place once the vane has been assembled.

The vane may be, for example, a fixed vane (OGV or Outlet Guide Vane) of a turbine engine, made of composite material and in particular a fan blade.

BRIEF DESCRIPTION OF THE SEVERAL VIEWS OF THE DRAWINGS

The invention will now be described in detail using the following figures which represent a specific embodiment of the invention which does not exclude others:

and following

FIG. 3 is a view of the vane looking towards the back face of the platform;

FIG. 4 is an analogous view, but with half of the platform removed;

FIG. 5 is an expanded version of FIG. 3, but which shows the entire extremity of the blade;

FIG. 6 shows the blade alone, viewed from the location of the platform;

FIG. 7 shows the assembly viewed from the side;

and FIG. 8 shows the assembly viewed from the internal platform.

DETAILED DESCRIPTION OF THE INVENTION

Figure 1:
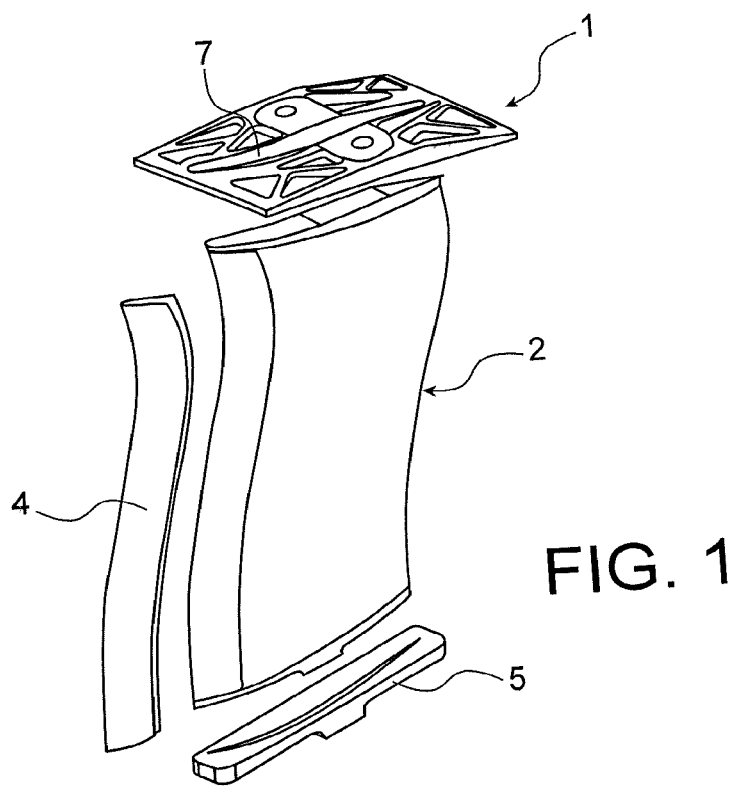
FIGS. 1 and 2, already described, show a known composite vane and its method of assembly.

The vane of the invention once again primarily comprises a platform and a blade, here 11 and 12, assembled together, and assembly being achieved by insertion with contact and bonding of an extremity, here 13, of the blade 12 into a cavity, here 14, of the platform 11.

The cavity 14 is demarcated by two lateral faces 16 and 17 in the form of arcs of circles which are approximately parallel, but which come slightly towards each other from a lateral opening 20 described below, and comprise a median line 15, also in the form of an arc of a circle, in a direction of extension of the cavity 14. The lateral faces 16 and 17 are reverse-tapered sides of a principal face or a back-face 18 of the platform 11 to another face opposite the previous in the direction of the thickness of the platform 11 or external face 19, from which the blade 12 rises, meaning that the cross section of the cavity 14 tapers inwards towards this external face 19.

The cavity 14 extends in a longitudinal direction which corresponds to a principal extension up to the lateral opening 20 on a side, which is made on the peripheral face of the platform 11. The width of the cavity 14 perpendicular to this longitudinal direction and to the direction of thickness is substantially constant over the greater part of its length from the lateral opening 20 up to a portion of the opposite extremity where this width is gradually decreasing.

Figure 7:
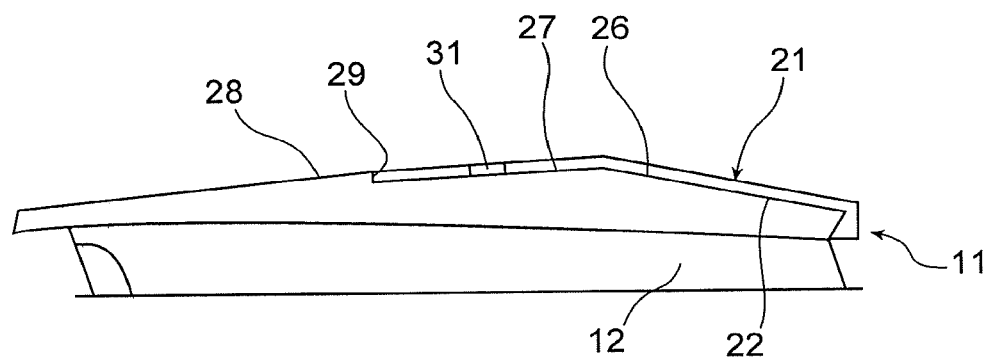
Figure 8:
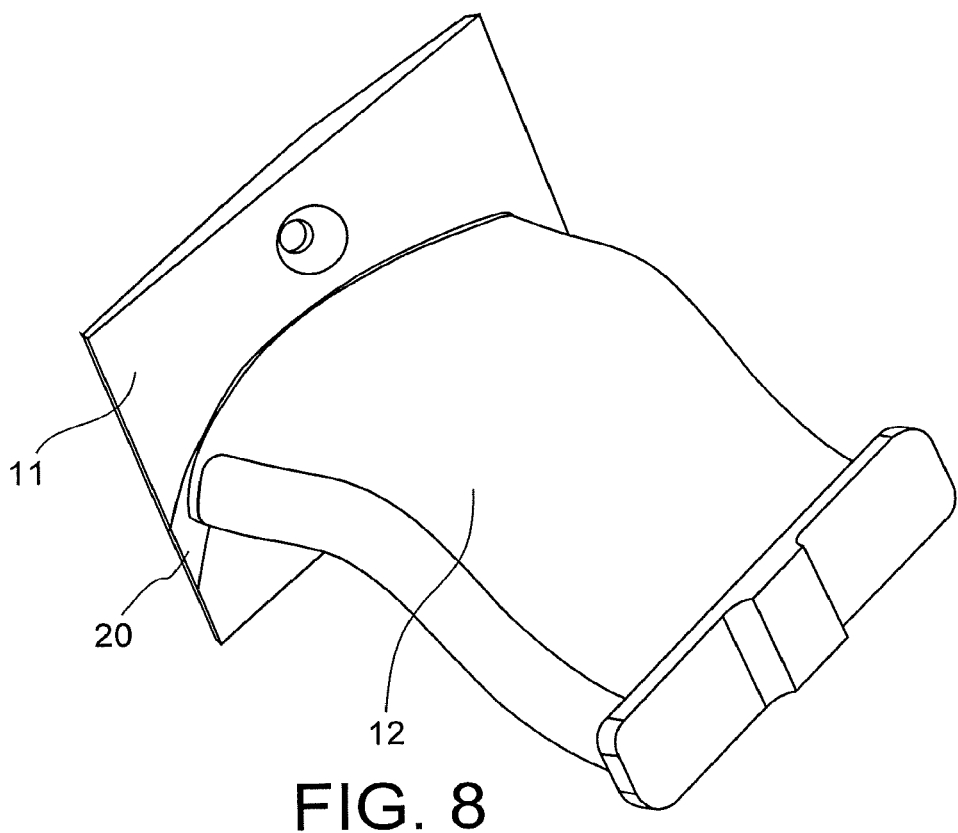

The platform 11 comprises a back wall 21 which closes off the cavity 14 on the side of the back-face 18, possibly only over a part of the length of the cavity 14, preferably corresponding to said extremity away from the lateral opening 20; if the latter detail is adopted, as is the case in the embodiment shown, the remainder of the cavity 14 nearer to the lateral opening 20 remains empty and the extremity 13 of the blade 12 remains visible when looking at the back face 18. The back wall 21 therefore demarcates a back of the cavity 14, which exhibits a sloping portion 22, which is inclined in the direction of the thickness of the platform 11 towards the main face 19 as one moves away from the lateral opening 20 (FIG. 7). The extent of the back wall 21 is selected to reconcile as far as possible the additional bonding area and the resulting increase in weight.

The shape of the extremity 13 of the blade 12 complements that of the cavity 14 and therefore ensures contact bonding with the platform 11, by occupying the cavity 14 in the assembled state. In particular it comprises lateral faces in the form of an arc of a circle and tapered, which means that the sections of the extremity 13 taper (by a reduction in the thickness of the blade) towards the remainder of the blade 12 and a terminal face 25 of the extremity 13. The terminal face 25 points towards the back wall 21 of the platform 11 and comprises, from front to rear, a sloped portion 26, which makes contact against the sloped portion 22 of the back wall 21, a median portion 27 which forms an external angle with the above and in sliding contact with the rear of the back wall 21, and a rear portion 28 which extends between the extremity of the back wall 21 and the lateral opening 20, at the location of the hollowed out part of the cavity 14, extending the back face 18 of the latter and separated from the median portion 27 by a level change step 29. The level change step 29 is located in front of an edge face 30, directed towards the lateral opening 20 of the cavity 14, of the back wall 21. The surfaces which must make contact with each other have been coated with adhesive, which on drying ensures permanent assembly.

Thus as has been stated, the conventional movement for assembly of the vane by introducing the blade through a fully hollowed out cavity is abandoned to be replaced by an assembly movement wherein the extremity 23 of the blade 12 is introduced by a sliding motion into the cavity from a lateral opening 20 in the longitudinal direction of the cavity defined in the median line 15. The movement is continued up to a contact stop which is provided, in this embodiment, by sloping portions 22 and 26 of the back wall 21 and of the extremity 13. The slopes of said portions in the direction of the thickness of the platform along the direction of insertion of the extremity 13 are the same, which ensures that an end contact is made over their entire surface.

Figure 2:
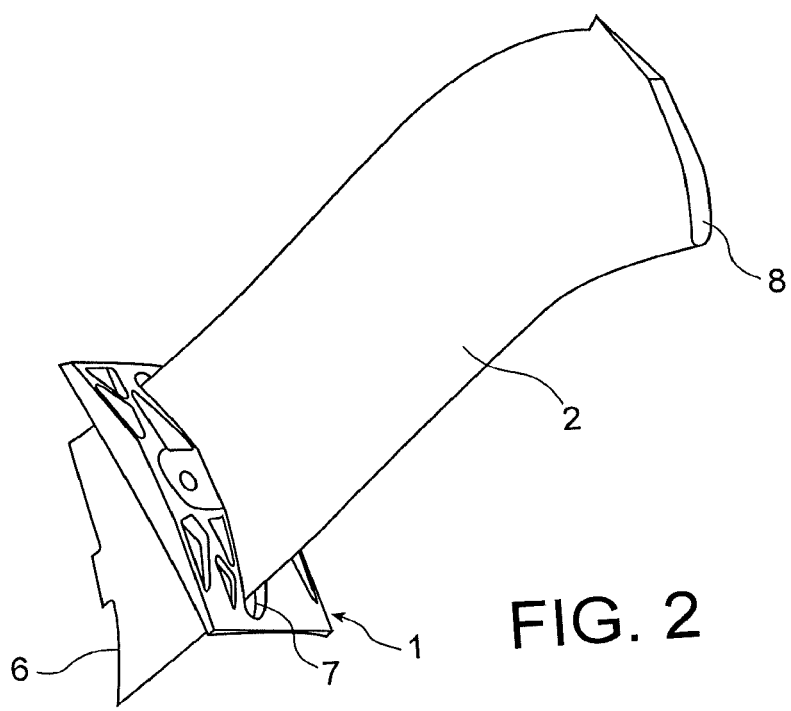
Figure 3:
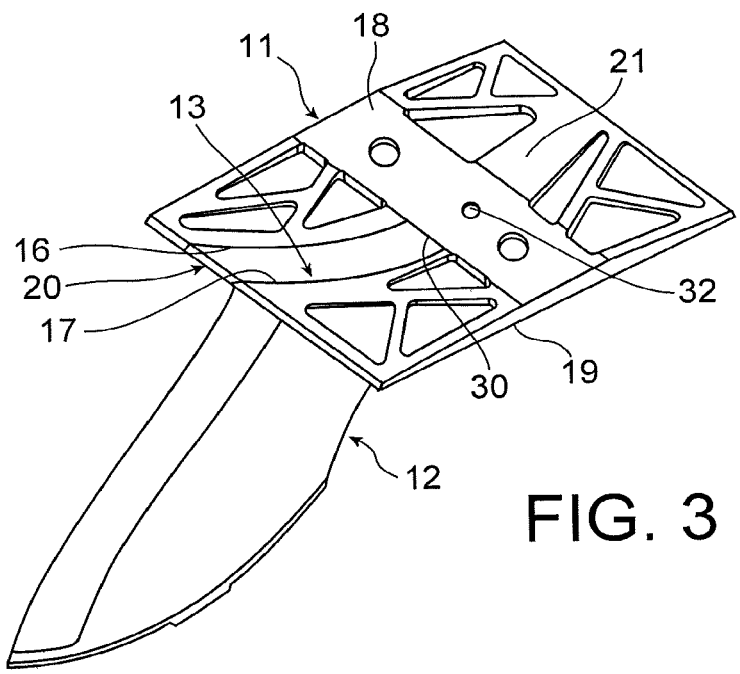
FIGS. 3 to 8 show an embodiment of the invention, where.
Figure 4:
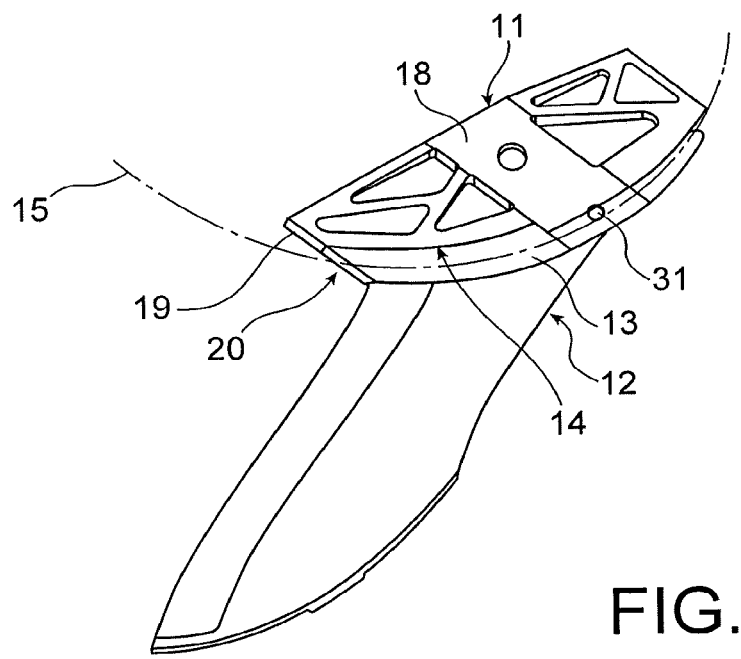
Figure 5:
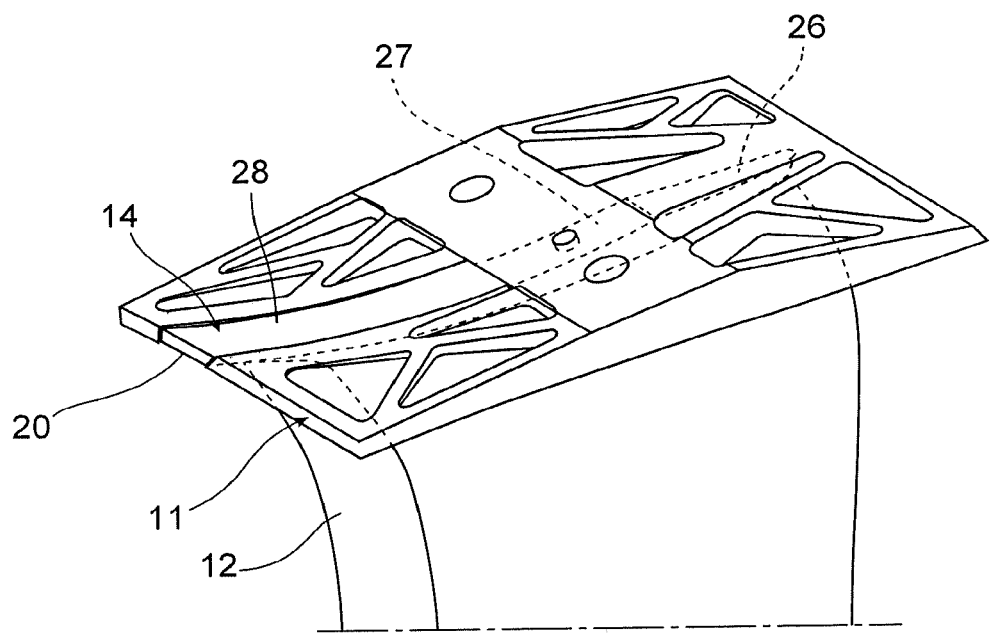
Figure 6:
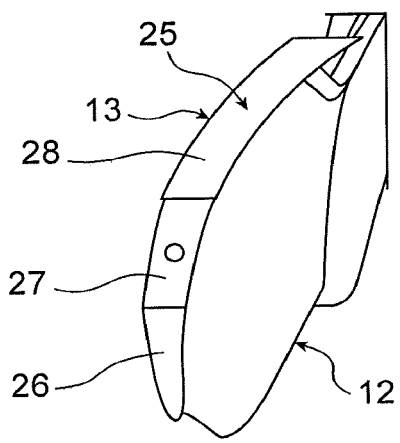

The contact surfaces between the platform 11 and the extremity 13 which are involved in the bonding comprise not only, as previously, the assembly surfaces which come into immediate contact, whose lateral faces exhibit a tapered or reverse tapered slope of the extremity 13 and of the cavity 14, and which ensure that immobilisation is achieved by the fitting together of complementary shapes, which are approximately conical, but also, in a manner which is characteristic of the invention, at least a portion of the surface of the back wall 21 and of the terminal face 25, whose surface makes an end-contact between the sloping portions 22 and 26. The degree of immobilisation achieved, which is greater than in the embodiment in FIGS. 1 and 2, also in itself ensures better cohesion of the vane in service.

The encapsulation of the extremity 13 achieved by adding the back wall 21 is therefore expressed as an increase, which may be significant, in the bonding area and improved strength as a consequence of the assembly. The strength of the assembly is substantially increased, in particular in terms of shear forces. Another consequence is that a greater freedom of design is achieved for the cavity 14, which no longer has to be large enough to allow the blade 12 to pass through.

In the sense of the invention, the terms bonding or fixing mean assembling together surfaces that face each other by adhesion, either through direct contact between these faces or through the intermediate of a connecting body.

The back wall 21 can in theory extend over any proportion whatsoever of the length of the cavity 14, but a partial extension is sufficient to give good results, increasing the bonded surface by 80%, for example, relative to a standard design.

The assembly can be held together, in addition to immobilisation, by a pin 31 inserted through a hole 32 made through the back wall 21 and an extension recess forming a cavity on the median part 27.

The invention claimed is:

1. A vane comprising:
   a platform and a blade assembled together,
   wherein the platform comprises a first principal face and a second principal face, the principal faces defining a thickness of the platform therebetween, and such that the second principal face is closer to the blade than the first principal face,
   wherein an extremity of the blade, of which defines a flared out portion of the blade, fits into a cavity of the platform, the extremity of the blade having a tapered sloping portion at a terminal face thereof, the cavity comprising a lateral opening at a peripheral side of the platform through which the extremity of the blade can be inserted into the cavity in a longitudinal direction of the cavity perpendicular to a direction of the thickness of the platform, such that the extremity of the blade is immobilized by contact with a back wall of the platform, and such that the blade emerges from the second principal face of the platform,
   wherein at least a portion of the cavity is closed off toward the first principal face and defined by the back wall of the platform, the back wall comprising a portion that is inclined in the direction of the thickness of the platform, such that the inclined portion of the back wall and the tapered sloping portion at the terminal face of the extremity of the blade are complementary surfaces in contact with one another and defined by a same angle of inclination.

2. The vane according to claim 1, wherein the back wall does not fully extend to the lateral opening at the peripheral side of the platform.

3. The vane according to claim 1, wherein the longitudinal direction of the cavity is arcuate.

4. The vane according to claim 1, wherein an extremity of the cavity has a width perpendicular to the direction of the thickness of the platform, which tapers in from the lateral opening in the longitudinal direction.

5. The vane according to claim 1, wherein the terminal face of the extremity of the blade further comprises two flat portions forming an external angle, one of which is adjacent to the inclined portion of the back wall.

6. The vane according to claim 1, wherein the terminal face of the extremity of the blade further comprises a difference in level at an edge face of the back wall, such that said edge face of the back wall is directed towards the lateral opening of the cavity, and the terminal face of the extremity of the blade possesses a portion that extends along the first principal face of the platform between the edge face of the back wall and the lateral opening of the cavity.

7. The vane according to claim 1, further comprising a pin for stopping the extremity of the blade from sliding within the cavity, wherein the pin extends through a drilling provided in the back wall and into a hole provided in the extremity of the blade.

8. The vane according to claim 1, wherein the vane is made of composite material.

9. The vane according to claim 8, wherein the vane is a fixed fan vane.

10. The vane according to claim 1, wherein the extremity of the blade and the cavity have complementary shapes and a cross-section which narrows towards the second principal face.

11. The vane according to claim 1, wherein the terminal face of the extremity of the blade includes a rear portion rearward of the tapered sloping portion, and a median portion between the rear portion and the tapered sloping portion, and
   wherein a width of the rear portion of the terminal face of the extremity of the blade is greater than a width of the tapered sloping portion of the terminal face of the extremity of the blade.

* * * * *